(12) United States Patent
Ebrahimi Afrouzi

(10) Patent No.: US 11,726,487 B1
(45) Date of Patent: Aug. 15, 2023

(54) METHOD FOR ROBOTIC DEVICES TO IDENTIFY DOORWAYS USING MACHINE LEARNING

(71) Applicant: Ali Ebrahimi Afrouzi, San Diego, CA (US)

(72) Inventor: Ali Ebrahimi Afrouzi, San Diego, CA (US)

(73) Assignee: AI Incorporated, Toronto (CA)

( * ) Notice: Subject to any disclaimer, the term of this patent is extended or adjusted under 35 U.S.C. 154(b) by 180 days.

(21) Appl. No.: 17/240,211

(22) Filed: Apr. 26, 2021

Related U.S. Application Data

(63) Continuation of application No. 15/614,284, filed on Jun. 5, 2017, now abandoned.

(60) Provisional application No. 62/345,979, filed on Jun. 6, 2016.

(51) Int. Cl.

| | |
|---|---|
| *G05D 1/00* | (2006.01) |
| *G05D 1/02* | (2020.01) |
| *B25J 9/16* | (2006.01) |
| *A47L 9/28* | (2006.01) |

(52) U.S. Cl.
CPC .......... *G05D 1/0221* (2013.01); *A47L 9/2826* (2013.01); *B25J 9/163* (2013.01); *G05D 1/0219* (2013.01); *G05D 1/0248* (2013.01); *G05D 1/0274* (2013.01); *A47L 2201/04* (2013.01); *G05D 2201/0203* (2013.01); *G05D 2201/0215* (2013.01)

(58) Field of Classification Search
CPC .. G05D 1/0221; G05D 1/0219; G05D 1/0248; G05D 1/0274; G05D 2201/0203; G05D 2201/0215; A47L 9/2826; A47L 2201/04; B25J 9/163
See application file for complete search history.

(56) References Cited

U.S. PATENT DOCUMENTS

| | | |
|---|---|---|
| 5,467,273 A | 11/1995 | Faibish |
| 6,442,476 B1 | 8/2002 | Poropat |
| 6,781,338 B2 | 8/2004 | Jones |
| 9,251,417 B1 | 2/2016 | Xu |
| 9,468,349 B2 | 10/2016 | Fong |
| 9,538,892 B2 | 1/2017 | Fong |
| 9,853,468 B2 | 12/2017 | Ireland |
| 11,256,261 B1 * | 2/2022 | Bai ................... G05D 1/0246 |
| 2006/0020370 A1 | 1/2006 | Abramson |
| 2007/0192910 A1 | 8/2007 | Vu |
| 2010/0100256 A1 | 4/2010 | Jurmain |
| 2014/0100693 A1 | 4/2014 | Fong |

(Continued)

*Primary Examiner* — Truc M Do

(57) ABSTRACT

A method for identifying a doorway, including receiving, with a processor of an automated mobile device, sensor data of an environment of the automated mobile device from one or more sensors coupled with the processor, wherein the sensor data is indicative of distances to objects within the environment; identifying, with the processor, a doorway in the environment based on the sensor data; marking, with the processor, the doorway in an indoor map of the environment; and instructing, with the processor, the automated mobile device to execute one or more actions upon identifying the doorway, wherein the one or more actions comprises finishing a first task in a first work area before crossing the identified doorway into a second work area to perform a second task.

20 Claims, 3 Drawing Sheets

(56) References Cited

U.S. PATENT DOCUMENTS

| | | | |
|---|---|---|---|
| 2014/0200713 A1* | 7/2014 | Allen | B25J 11/009 901/1 |
| 2015/0190925 A1 | 7/2015 | Hoffman | |
| 2016/0143500 A1 | 5/2016 | Fing | |
| 2016/0297072 A1* | 10/2016 | Williams | B25J 9/1666 |

* cited by examiner

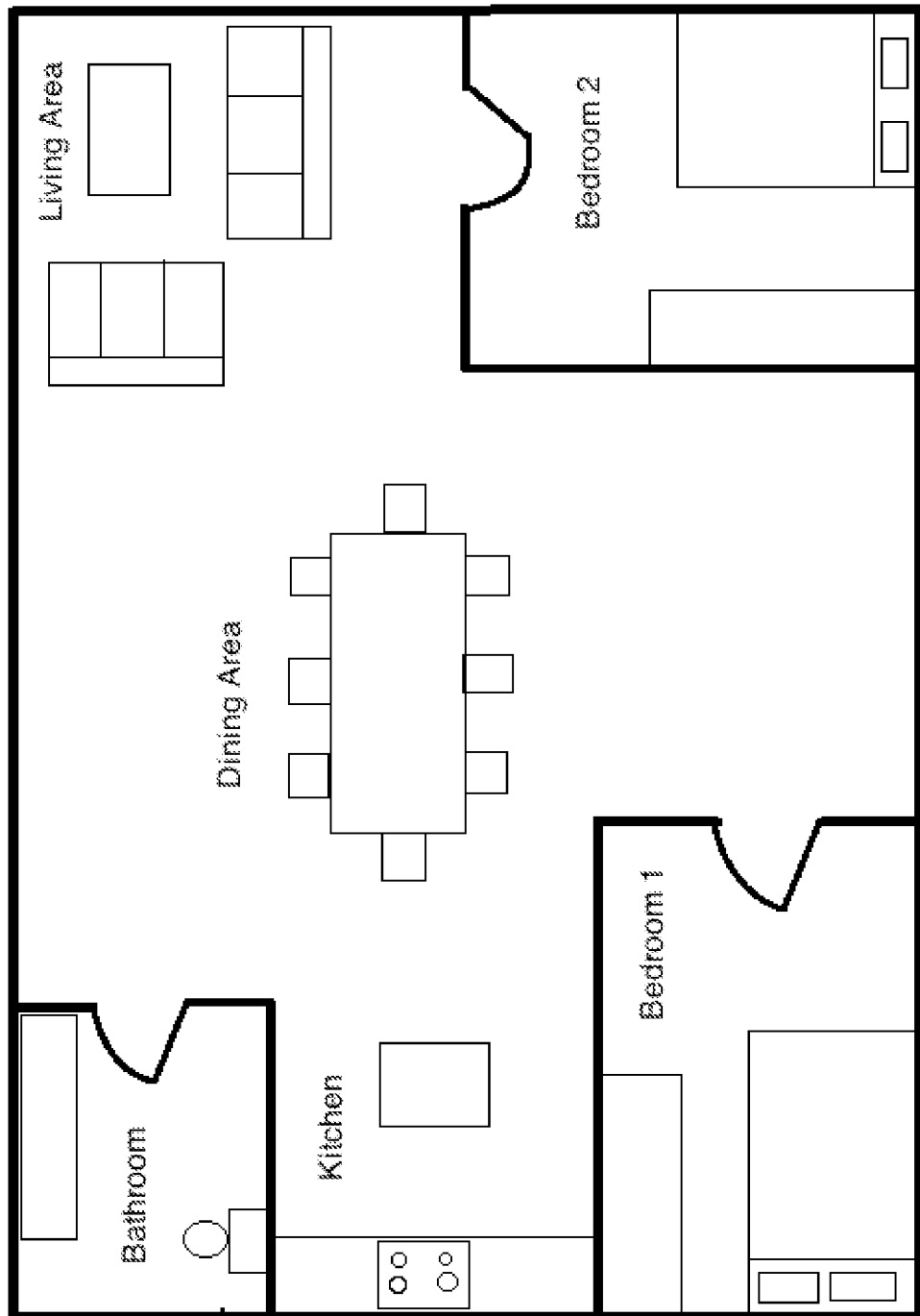

METHOD FOR ROBOTIC DEVICES TO IDENTIFY DOORWAYS USING MACHINE LEARNING

CROSS-REFERENCE TO RELATED APPLICATIONS

This application is a Continuation of U.S. Non-Provisional patent application Ser. No. 15/614,284, filed Jun. 5, 2017, which claims the benefit of U.S. Provisional Patent Application No. 62/345,979, filed Jun. 6, 2016, each of which is hereby incorporated by reference.

FIELD OF THE DISCLOSURE

The disclosure relates to methods for identifying doorways in mobile devices using depth extracting devices such as depth cameras, light detection and ranging (LIDAR) sensors and other distance measurement tools to create maps of work areas. Machine learning techniques are used to identify doorways in an indoor map. Machine learning is used to classify landmarks and openings as doorways or non-doorways based on the collected information, such as measured distances to the surroundings.

BACKGROUND

There have been numerous advances in the automated robotic devices industry and autonomous mobile robots. One issue that has remained elusive is the ability for said robotic device to understand when it is approaching a doorway in order to make a determination based on this information. For instance, with a robotic vacuum, if it encounters an open doorway while cleaning a first room, said robot might enter that doorway and begin cleaning a second room without finishing cleaning the first room. As the robot stores the area cleaned as a map in its memory, this may in turn cause mapping issues in the future because the robot may not realize it has not cleaned two rooms but believes it has only cleaned one room. It is imperative that robotic devices have doorway sensing capabilities in order to make probabilistic estimation about where the boundaries between rooms are, whether to finish cleaning a first room before entering the second room, or whether to ignore cleaning the second room at all.

SUMMARY

Some aspects include a method for identifying a doorway, including: receiving, with a processor of an automated mobile device, sensor data of an environment of the automated mobile device from one or more sensors coupled with the processor, wherein the sensor data is indicative of distances to objects within the environment; identifying, with the processor, a doorway in the environment based on the sensor data; marking, with the processor, the doorway in an indoor map of the environment; and instructing, with the processor, the automated mobile device to execute one or more actions upon identifying the doorway, wherein the one or more actions comprises finishing a first task in a first work area before crossing the identified doorway into a second work area to perform a second task.

Some aspects include a method for identifying a doorway, including: receiving, with a processor of an automated mobile device, sensor data of an environment of the automated mobile device from one or more sensors coupled with the processor, wherein the sensor data is indicative of distances to objects within the environment; identifying, with the processor, a doorway in the environment by detection of at least one feature in the sensor data indicative of the presence of the doorway, the at least one feature comprising an increase in the distances to objects by at least a first predetermined amount compared to a first set of distances for a predetermined number of time steps followed by a decrease in the distances to objects by at least a second predetermined amount compared to a second set of distances for at least a second predetermined number of time steps; marking, with the processor, the doorway in an indoor map of the environment; and instructing, with the processor, the automated mobile device to execute one or more actions upon identifying the doorway.

Some aspects provide an automated mobile device, including: at least one sensor comprising any of: a LIDAR sensor, a depth camera, and a TOF sensor, wherein the automated mobile device is configured to: receive sensor data of an environment of the automated mobile device from the at least one sensor, wherein the sensor data is indicative of distances to objects within the environment; identify a doorway in the environment by detection of at least one feature in the sensor data indicative of the presence of the doorway; mark the doorway in an indoor map of the environment; execute one or more actions upon identifying the doorway, the one or more actions comprising at least avoiding crossing the doorway until the automated mobile device has encountered the doorway a predetermined number of times.

BRIEF DESCRIPTION OF THE DRAWINGS

FIG. 3 illustrates an example of a floor plan type provided in a training set to the mobile robotic device.

DETAILED DESCRIPTION OF SOME EMBODIMENTS

Figure 1:
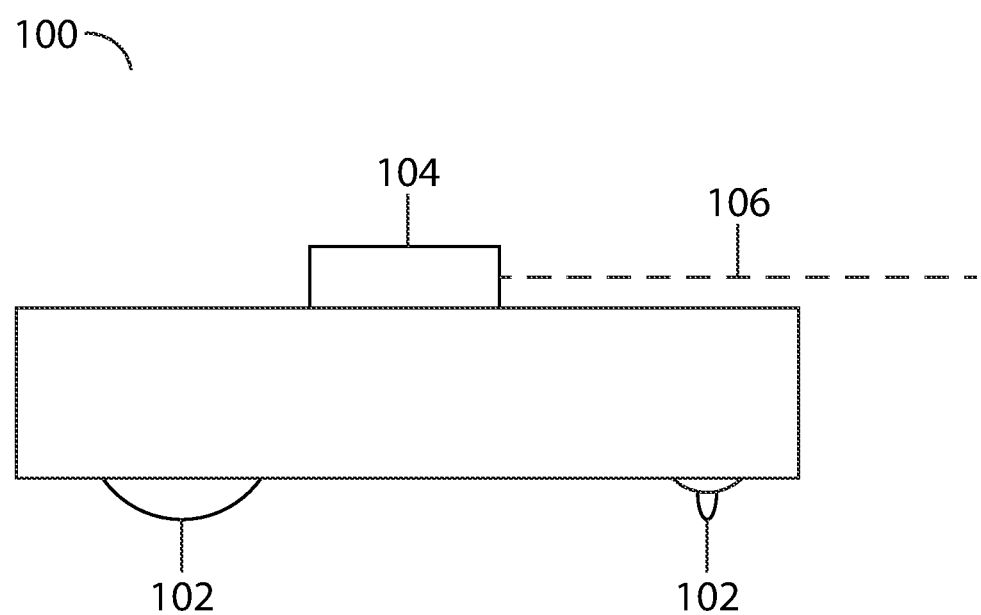
FIG. 1 illustrates a side elevation view of a mobile robotic device, according to some embodiments.

Some embodiments provide a method for a mobile device to detect physical doorways.

Some embodiments provide a method for a mobile device to generate a two-dimensional map, including the presence of doorways, for navigation using a LIDAR sensor, depth camera, time of flight (TOF) sensor or other distance measurement devices.

Some embodiments provide a method for a mobile device with a LIDAR sensor, depth camera, TOF sensor or other distance measurement devices to have a machine learning algorithm which can identify the features of doorways and non-doorways.

Some embodiments provide a method for a mobile device to have a training set which includes two-dimensional maps of numerous sample environments with doorway features.

Some embodiments provide a method for a mobile device to determine the probability as to whether or not a doorway is present based on comparing the information obtained from the LIDAR sensor, depth camera, TOF sensor or other distance measurement devices with the two-dimensional map provided in the training set.

Some embodiments provide a method for a mobile device to develop a classifier system based on doorway features for use while working.

Some embodiments provide a method for a mobile device to enact a specific coverage pattern based on the presence of a doorway.

Some embodiments provide a method for a mobile device to understand the existence of a doorway to ensure thorough cleaning coverage of each separate workspace.

Some embodiments provide a method for a mobile device to avoid entering a doorway in order to clean a workspace completely prior to entering a second workspace and cleaning the second workspace.

Some embodiments use a LIDAR sensor, depth camera, TOF sensor or other distance measurement devices mounted or positioned within the mobile robot to detect distances to the surrounding objects by analysis using a classifier machine learned algorithm, such as those using regression techniques, support vector machines, binary classifiers or the like, to identify the presence of a doorway in the mapped environment. Based on input from the sensor, and the resulting identifications of the existence of a doorway or not, the device may be configured to activate various movement patterns. In one embodiment, an identified doorway is marked in a map of the workspace. In another embodiment, the device is programmed to treat the doorway as a linear obstacle and to not cross the area identified as a doorway. In another embodiment, the device may be programmed to not cross a doorway until the device has encountered the doorway a minimum number of times. In still another embodiment, the device may be programmed to enter a doorway into a second workspace to clean the second workspace prior to finishing cleaning the first workspace.

Some embodiments introduce a method for identifying doorways in the work environments of mobile robotic devices utilizing LIDAR sensors, depth sensors, TOF sensors, stereo vision, and other distance or depth measuring technologies to generate a map for navigation. A mobile robotic device may include a form of distance measuring device which measures distances to all the areas surrounding the robot. For example, a LIDAR distance measuring system may capture the distances to obstacles in 360 degrees and generate points in a 2D grid map to create a two-dimensional map of the work environment at the height of the LIDAR sensor using simultaneous localization and mapping (SLAM) techniques. The same kind of 2D or 3D maps may be generated by all measurement devices that can measure the distance to the surroundings. For example, LIDAR technology or depth cameras or stereo vision cameras may generate measurements to surroundings to create maps of work environments using SLAM algorithms such that mobile robotic devices may better navigate through the environment. However, with current SLAM methods the whole map is treated with the same preference. In one example, using a robotic floor cleaner, it may be preferable to have a robotic floor cleaning system completely clean a first room prior to allowing the robotic cleaning device to clean a second room. One solution may include providing a virtual barrier device or the like at the location of the doorway. However, it is more advantageous to design the mobile robot itself such that it may automatically detect a doorway without need for external additional components. The following descriptions provide a method for identifying doorways based on measurements taken by, for example, a LIDAR sensor.

Some embodiments use a supervised machine learning algorithm to identify features of doorways and non-doorways. A training set provides two-dimensional maps of numerous sample environments with corresponding robot positions within those maps. All of the areas of each sample environment may be identified by an administrator as either a doorway or non-doorway. In this way, the system may extract the common features of both doorways and non-doorways. The differences between the distance to a first obstacle and the distance to a second obstacle may be analyzed by the system iteratively, such that distance differences that distinguish doorways are identified. From the training set, and using a common supervised learning classifier, the machine may infer locations that have a high probability of being a doorway. The map created by the SLAM algorithm based on the input received from sensors of the robot may be considered a test set and the machine learning algorithm may examine the data on an online manner during the progress of the work session. As measurements are taken, the classifier may be applied to identify areas as doorways or non-doorways.

In some embodiments, upon identifying a doorway, the doorway may be marked in a map of the workspace.

In some embodiments, the mobile device may be programmed to treat identified doorways as linear obstacles and not cross the area identified as a doorway.

In some embodiments, the mobile device may be programmed to treat identified doorways as linear obstacles and not cross the area identified as a doorway for a predetermined amount of time or until the device has encountered the doorway a minimum number of times.

In some embodiments, the mobile device may be programmed to enter a doorway into a second workspace before reentering the doorway in the opposite direction to complete the cleaning of the first workspace.

FIG. 1 illustrates a side elevation view of mobile device 100, according to some embodiments. Mobile device 100 includes wheels 102 and LIDAR sensor 104. Line 106 represents a light beam emitted by the LIDAR sensor 104 in capturing distance data. In some embodiments, LIDAR sensor 104 may be rotatable about an axis perpendicular to the plane of the work surface such that distance measurements may be captured in 360 degrees around the mobile device.

Figure 2:
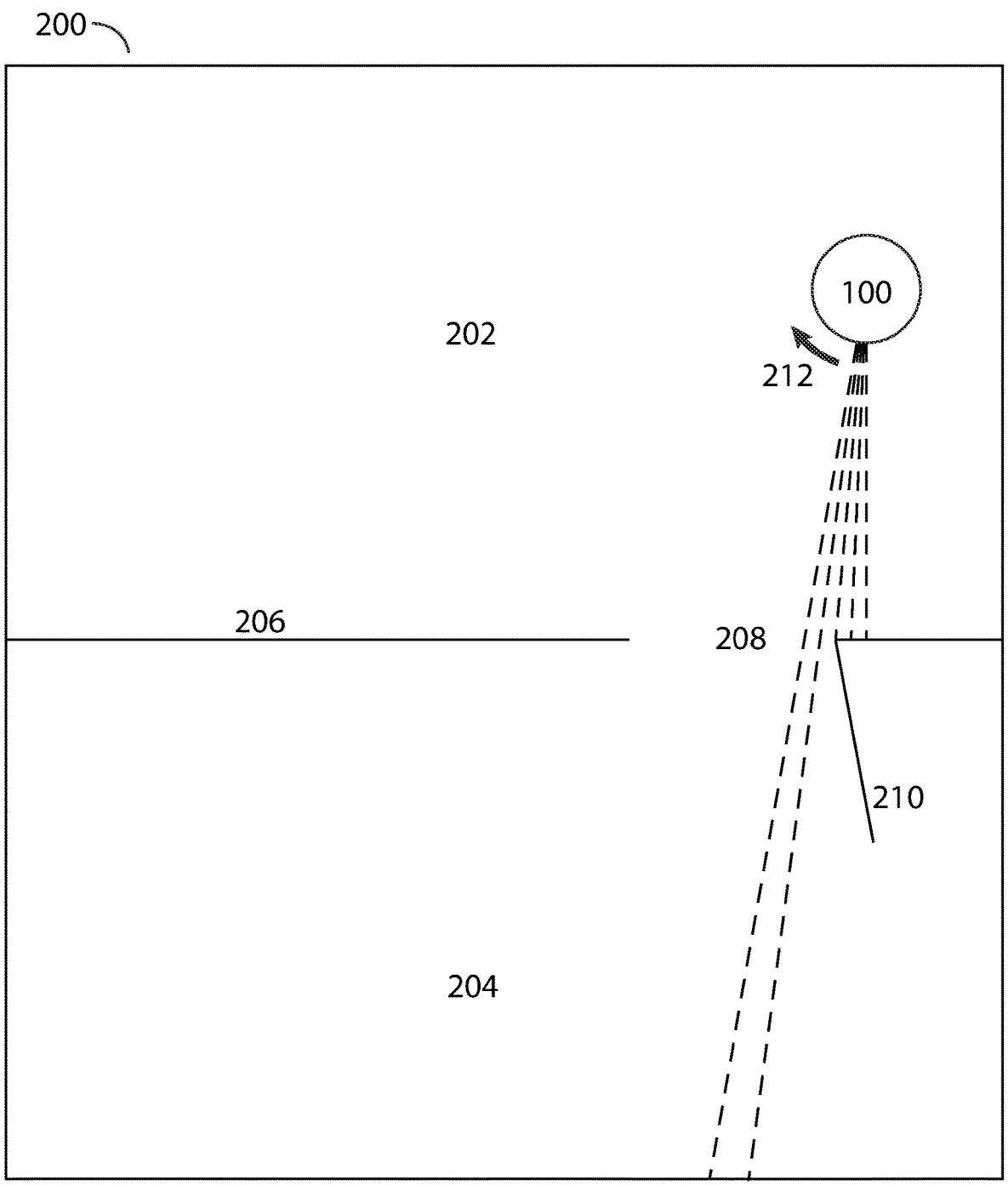
FIG. 2 illustrates an overhead view of a mobile robotic device identifying a doorway, according to some embodiments.

FIG. 2 illustrates an overhead view of an example workspace 200. Workspace 200 has two sections, room 202 and room 204 that are divided by wall 206. Doorway 208 connects the two sections when door 210 is open. Lines 106 represent the light beams used to capture distance data. As the LIDAR sensor rotates in a clockwise direction 212, distance measurements from the mobile device 100 to the nearest obstacle increase suddenly when the LIDAR sensor begins measuring the distances within the doorway 208. The sudden increase in distance may be identified as a doorway using a classifier. As the LIDAR sensor continues to rotate in clockwise direction 212, the distances measured suddenly decrease when the LIDAR sensor reaches the end of the doorway 208 and the measurements taken reflect the distance from the mobile device to the wall 206. The sudden decrease in distance may be identified as the end of the doorway using the classifier. Identification of a doorway may be used in a variety of different ways without limitation. In some embodiments, upon identifying a doorway, mobile devices mark the location of the doorway in a digital map of the workspace. In some embodiments, mobile devices are programmed not to cross identified doorways for a predetermined amount of time or until the mobile device has encountered the doorway a predetermined number of times.

FIG. 3 illustrates an example of a floor plan type provided in a training set to the mobile robotic device.

The invention claimed is:

1. A method for identifying a doorway, comprising:
receiving, with a processor of an automated mobile device, sensor data of an environment of the automated mobile device from one or more sensors coupled with the processor, wherein the sensor data is indicative of distances to objects within the environment;
identifying, with the processor, a doorway in the environment based on the sensor data by detecting an increase in the distances to objects by at least a first predetermined amount for at least a first predetermined number of time steps followed by a decrease in the distances to objects by at least a second predetermined amount for at least a second predetermined number of time steps;
marking, with the processor, the doorway in an indoor map of the environment; and
instructing, with the processor, the automated mobile device to execute one or more actions upon identifying the doorway.

2. The method of claim 1, wherein the processor creates or updates the indoor map of the environment based on the sensor data.

3. The method of claim 1, wherein the one or more sensors comprise at least one of: a light detecting and ranging (LIDAR) sensor, a depth camera, a time-of-flight (TOF) sensor, and a stereo vision system.

4. The method of claim 1, further comprising:
instructing, with the processor, the automated mobile device to collect sensor data using the one or more sensors while driving along a movement path; and
generating or updating, with the processor, the indoor map based on the sensor data and simultaneous localization and mapping techniques.

5. The method of claim 1, wherein:
the one or more actions comprises finishing a first task in a first work area before crossing the identified doorway into a second work area to perform a second task; and
the first task and the second task comprise cleaning the first work area and the second work area, respectively.

6. The method of claim 1, wherein the one or more actions comprises avoiding crossing the identified doorway for a predetermined amount of time.

7. The method of claim 1, wherein the one or more actions comprises avoiding crossing the identified doorway until encountering the identified doorway a predetermined number of times.

8. The method of claim 1, wherein the one or more actions comprises executing a particular movement path.

9. The method of claim 1, wherein the processor uses the identified doorway as a divider for dividing the indoor map of the environment into separate areas.

10. The method of claim 1, wherein the processor determines the values of the first predetermined amount, the first predetermined number of time steps, the second predetermined amount, and the second predetermined number of time steps using one or more training sets of sensor data, wherein the one or more training sets of sensor data comprises at least a portion of the sensor data corresponding to a doorway.

11. The method of claim 10, wherein at least a portion of the one or more training sets of sensor data comprises data from which one or more two-dimensional maps are created.

12. The method of claim 1, wherein the processor determines the values of the first predetermined amount, the first predetermined number of time steps, the second predetermined amount, and the second predetermined number of time steps by training a machine learning algorithm, wherein the one or more training sets of sensor data comprise at least a portion of the sensor data corresponding to a doorway and are used as input into the machine learning algorithm.

13. The method of claim 12, wherein the one or more training sets of sensor data are chosen based on a region, a type of area, or a country within which the automated mobile device is to operate.

14. An automated mobile device, comprising:
at least one sensor comprising any of: a LIDAR sensor, a depth camera, and a TOF sensor, wherein the automated mobile device is configured to:
receive sensor data of an environment of the automated mobile device from the at least one sensor, wherein the sensor data is indicative of distances to objects within the environment;
identify a doorway in the environment by detection of at least one feature in the sensor data indicative of the presence of the doorway by detecting an increase in the distances to objects by at least a first predetermined amount for at least a first predetermined number of time steps followed by a decrease in the distances to objects by at least a second predetermined amount for at least a second predetermined number of time steps;
mark the doorway in an indoor map of the environment;
execute one or more actions upon identifying the doorway.

15. The automated mobile device of claim 14, wherein:
the automated mobile device is further configured to create or update the indoor map of the environment based on the sensor data; and
the one or more sensors comprise at least one of: a light detecting and ranging (LIDAR) sensor, a depth camera, a time-of-flight (TOF) sensor, and a stereo vision system.

16. The automated mobile device of claim 14, wherein:
the one or more actions comprises finishing a first task in a first work area before crossing the identified doorway into a second work area to perform a second task; and
the first task and the second task comprise cleaning the first work area and the second work area, respectively.

17. The automated mobile device of claim 14, wherein the one or more actions comprises at least one of:
avoiding crossing the identified doorway for a predetermined amount of time;
avoiding crossing the identified doorway until encountering the identified doorway a predetermined number of times; and
executing a particular movement path.

18. The automated mobile device of claim 14, wherein the automated mobile device is further configured to use the identified doorway as a divider to divide the indoor map of the environment into separate areas.

19. The automated mobile device of claim 14, wherein the automated mobile device is further configured to determine the values of the first predetermined amount, the first predetermined number of time steps, the second predetermined amount, and the second predetermined number of time steps using one or more training sets of sensor data, wherein the one or more training sets of sensor data comprises at least a portion of the sensor data corresponding to a doorway.

20. The automated mobile device of claim 14, wherein the automated mobile device is further configured to determine the values of the first predetermined amount, the first predetermined number of time steps, the second predetermined amount, and the second predetermined number of time steps by training a machine learning algorithm, wherein the one or more training sets of sensor data comprise at least a portion of the sensor data corresponding to a doorway and are used as input into the machine learning algorithm.

\* \* \* \* \*